United States Patent
Guen (10) Patent No.: US 9,979,005 B2
(45) Date of Patent: May 22, 2018

(54) RECHARGEABLE BATTERY HAVING SHORT CIRCUIT MEMBER

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 398 days.

(21) Appl. No.: 14/919,670

(22) Filed: Oct. 21, 2015

(65) Prior Publication Data

US 2016/0293930 A1 Oct. 6, 2016

(30) Foreign Application Priority Data

Apr. 6, 2015 (KR) ........................ 10-2015-0048421

(51) Int. Cl.
*H01M 2/12* (2006.01)
*H01M 2/34* (2006.01)

(52) U.S. Cl.
CPC ......... *H01M 2/345* (2013.01); *H01M 2/1223* (2013.01); *H01M 2200/20* (2013.01); *H01M 2220/20* (2013.01)

(58) Field of Classification Search
CPC .. H01M 2/345; H01M 2/1223; H01M 2/1229; H01M 2/1205; H01M 2/34; H01M 2/0456; H01M 2/04; H01M 2200/20; H01M 2220/20
See application file for complete search history.

(56) References Cited

U.S. PATENT DOCUMENTS

| | | | |
|---|---|---|---|
| 2011/0195286 A1* | 8/2011 | Aota ................ | H01M 2/263 429/94 |
| 2013/0216879 A1* | 8/2013 | Egawa .............. | H01M 10/0587 429/94 |
| 2013/0252053 A1* | 9/2013 | Woo ................. | H01M 2/26 429/94 |

* cited by examiner

*Primary Examiner* — Raymond Alejandro
(74) *Attorney, Agent, or Firm* — Lewis Roca Rothgerber Christie LLP (57) ABSTRACT

A rechargeable battery has a short circuit member that improves safety. The rechargeable battery includes: an electrode assembly including a first electrode and a second electrode; a case having an opening and housing the electrode assembly; a first terminal electrically connected to the first electrode; a second terminal electrically connected to the second electrode; a cap plate coupled to the case at the opening, the cap plate having a short circuit opening and being electrically connected to the first electrode; a short circuit member inserted into the short circuit opening and electrically connecting the cap plate to the second terminal when the short circuit member is modified due to a change in pressure; an upper cover covering the short circuit opening and having an air opening; and a plug inserted into the air opening and being movable by the short circuit member.

15 Claims, 8 Drawing Sheets

RECHARGEABLE BATTERY HAVING SHORT CIRCUIT MEMBER

CROSS-REFERENCE TO RELATED APPLICATION

This application claims priority to and the benefit of Korean Patent Application No. 10-2015-0048421 filed in the Korean Intellectual Property Office on Apr. 6, 2015, the entire content of which is incorporated herein by reference.

BACKGROUND

1. Field

Aspects of the present invention relate to a rechargeable battery. More particularly, aspects of the present invention relate to a rechargeable battery having a short circuit member.

2. Description of the Related Art

Unlike a primary battery, a rechargeable battery is designed to repeatedly perform charge and discharge functions. Small capacity rechargeable batteries may be used in small portable electronic devices such as mobile phones, laptop computers, and camcorders, and large capacity rechargeable batteries may be used in power sources for driving motors of hybrid vehicles and the like.

In recent years, a high power rechargeable battery using a non-aqueous electrolyte having high energy density has been developed. The high power rechargeable battery is a large capacity rechargeable battery with a plurality of rechargeable batteries connected to each other in series to be used to drive a motor of a device requiring high power, such as an electric vehicle.

The large capacity rechargeable battery generally includes a plurality of rechargeable batteries which are connected to each other in series, and the rechargeable battery may have a cylindrical shape or an angular shape.

Such a rechargeable battery requires a safety apparatus capable of reducing or preventing excessive heat and ensuring safety upon overcharge.

The above information disclosed in this Background section is only for enhancing understanding of the background of the invention and therefore it may contain information that does not form prior art.

SUMMARY

One or more embodiments of the present invention are directed toward an effort to provide a rechargeable battery having a short circuit member that improves safety.

An exemplary embodiment of the present invention provides a rechargeable battery including: an electrode assembly including a first electrode and a second electrode; a case having an opening and housing the electrode assembly; a first terminal electrically connected to the first electrode; a second terminal electrically connected to the second electrode; a cap plate coupled to the case at the opening, the cap plate having a short circuit opening and being electrically connected to the first electrode; a short circuit member inserted into the short circuit opening and electrically connecting the cap plate to the second terminal when the short circuit member is modified; an upper cover covering the short circuit opening and having an air opening; and an plug inserted info the air opening and being movable by the short circuit member.

The plug may include a shaft and a flange protruding in a lateral direction from an end in a length direction of the shaft. The plug may have a separation prevention protrusion protruding to an outer side of the shaft.

The upper cover may include a positioning groove in which the flange may be inserted, and the positioning groove may be connected to a top end of the air opening. A short circuit plate may be under the second terminal, and the short circuit plate may include a connection opening in an upper portion of the short circuit member.

An upper insulator may be between the short circuit plate and the cap plate. The short circuit plate may include a short circuit protrusion, and the short circuit protrusion may surround the connection opening.

A bottom end of the plug may protrude in a direction of the short circuit member as compared with a bottom end of the short circuit protrusion, and may be spaced apart from a top end of the short circuit protrusion. The upper cover may include a protrusion defining a circumference around the air opening, and a bottom surface of the protrusion may include a curved groove having an arc-shaped longitudinal section In a height direction of the air opening, an inner side of the air opening may include an exhaust groove. The upper cover may include an upper plate and a lateral plate protruding toward the cap plate from a lateral end of the upper plate, the lateral plate being inserted into the upper insulator.

The upper cover may further include a blocking wall at an inner side of a sidewall of the upper insulator and the blocking wall may include a ring shaped transverse section and surround the protrusion. A bottom surface of the plug may be curved to have an arc shape.

The short circuit member may include an edge and a curved part which is convexly curved downward from the edge. The first terminal may protrude to an outer side of the cap plate and may be electrically connected to the cap plate through a connection plate.

In accordance with an exemplary embodiment of the present invention, since the plug is installed, when an internal pressure of the rechargeable battery is increased, the short circuit member may be easily inverted.

DETAILED DESCRIPTION

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. Further, in the specification, the same constituent elements will be assigned with the same reference numerals.

Expressions such as "at least one of," when preceding a list of elements, modify the entire list of elements and do not modify the individual elements of the list. Further, the use of "may" when describing embodiments of the present invention refers to "one or more embodiments of the present invention." It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. As used herein, the term "and/or" includes any and all combinations of one or more of the associated listed items. Also, the term "exemplary" is intended to refer to an example or illustration.

Figure 1:
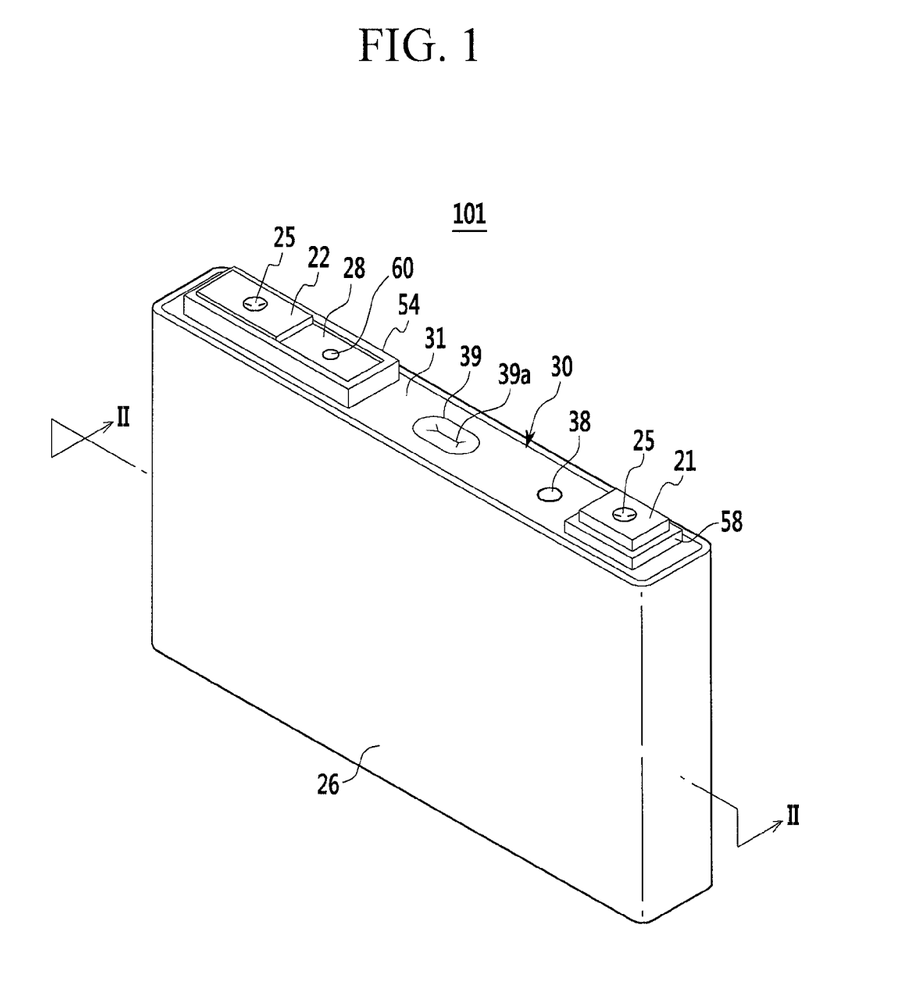
FIG. 1 is a perspective view illustrating a rechargeable battery according to a first exemplary embodiment of the present invention.
Figure 2:
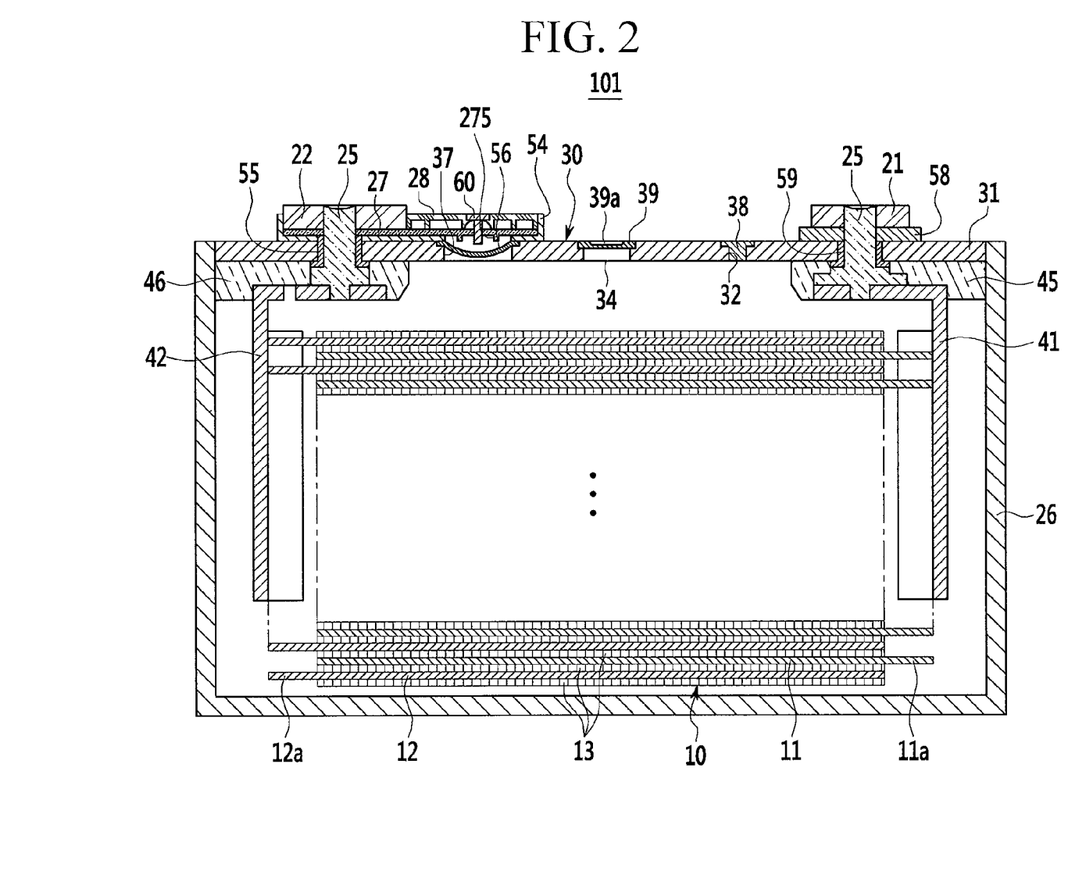
FIG. 2 is a cross-sectional view of the rechargeable battery taken along the line of FIG. 1.

FIG. 1 is a perspective view illustrating a rechargeable battery according to a first exemplary embodiment of the present invention, and FIG. 2 is a cross-sectional view of the rechargeable battery taken along the line II-II of FIG. 1.

Referring to FIG. 1 and FIG. 2, the rechargeable battery 101 according to an exemplary embodiment includes: an electrode assembly 10 wound by interposing a separator 13 between a positive electrode (first electrode) 11 and a negative electrode (second electrode) 12, a case 26 to receive the electrode assembly 10, and a cap assembly 30 coupled with an opening of the case 26.

As an example, the rechargeable battery 101 according to an exemplary embodiment is a lithium ion secondary battery and has a square shape. However, the present invention is not limited thereto. That is, the present invention is applicable to various suitable types of batteries such as a lithium polymer battery or a cylindrical battery.

The positive electrode 11 and the negative electrode 12 include a coated region including a current collector formed of a metal foil of a thin plate coated with an active material, and uncoated regions 11a and 12a including a current collector which is not coated with the active material. The positive electrode uncoated region 11a is formed at one end of the positive electrode 11 in a longitudinal direction of the positive electrode 11, and the negative uncoated region 12a is formed at an opposite end of the negative electrode 12 in a longitudinal direction of the negative electrode 12. Further, the positive electrode 11 and the negative electrode 12 are spirally wound while interposing the separator 13 (which is an insulator) therebetween.

However, the present invention is not limited thereto. That is, the above electrode assembly 10 may have a structure that is laminated to have the positive electrode and the negative electrode made of a plurality of sheets while interposing the separator between.

The case 26 has a substantially cuboid shape, and an opening is formed at one surface of the case. The case 26 may be made of a metal such as aluminum and stainless steel.

The cap assembly 30 includes a cap plate 31 to cover the opening of the case 26, a second terminal 22 which protrudes to an outer side of the cap plate 31, and a first terminal 21 electrically connected to the positive electrode 11 and an outer side of the cap plate 31.

The cap plate 31 has a plate shape which is formed long in one direction, and is coupled to the case 26 at the opening. The cap plate 31 is formed with an electrolyte injection opening 32 therein, and a sealing stopper 38 is formed in the electrolyte injection opening 32. Further, the cap plate 31 is formed with a vent opening (e.g., a vent hole) 34 therein and a vent plate 39 formed in the vent hole 34 with a notch 39a at the vent hole 34 that opens at a pressure (e.g., a preset pressure).

The first terminal 21 and the second terminal 22 protrude to an upper portion of the cap plate 31. The first terminal 21 is electrically connected to the positive electrode 11 through the medium of a first current collecting tab 41, and the second terminal 22 is electrically connected to the negative electrode 12 through the medium of a second current collecting tab 42. However, the present invention is not limited thereto. That is, the first terminal 21 may be electrically connected to the negative electrode 12, and the second terminal 22 may be electrically connected to the positive electrode 11.

The first terminal 21 has a rectangular plate shape. The first terminal 21 is electrically connected to the positive electrode 11 through the medium of a rivet terminal 25 joined to the current collecting tab 41. The second terminal 22 is electrically connected to the negative electrode 12 through the medium of the rivet terminal 25 joined to the current collecting tab 42. The rivet terminal 25 coupled with the first terminal 21 and the rivet terminal 25 coupled with the second terminal 22 have the same or substantially the same structure.

A sealing gasket 59 for sealing is inserted and installed in an opening (e.g., a hole), through which the first terminal 21 is formed, between the first terminal 21 and the cap plate 31, and a lower insulation member 45 for insulating the first terminal 21 and the current collecting tab 41 from the cap plate 31 is installed under the cap plate 31.

A connecting plate 58 for electrically connecting the first terminal 21 to the cap plate 31 is installed under the first terminal 21. The connecting plate 58 is disposed between the cap plate 31 and the first terminal 21, and the rivet terminal 25 is installed through the connecting plate 58. The cap plate 31 may be electrically connected to the first terminal 21 by the above structure.

Figure 3:
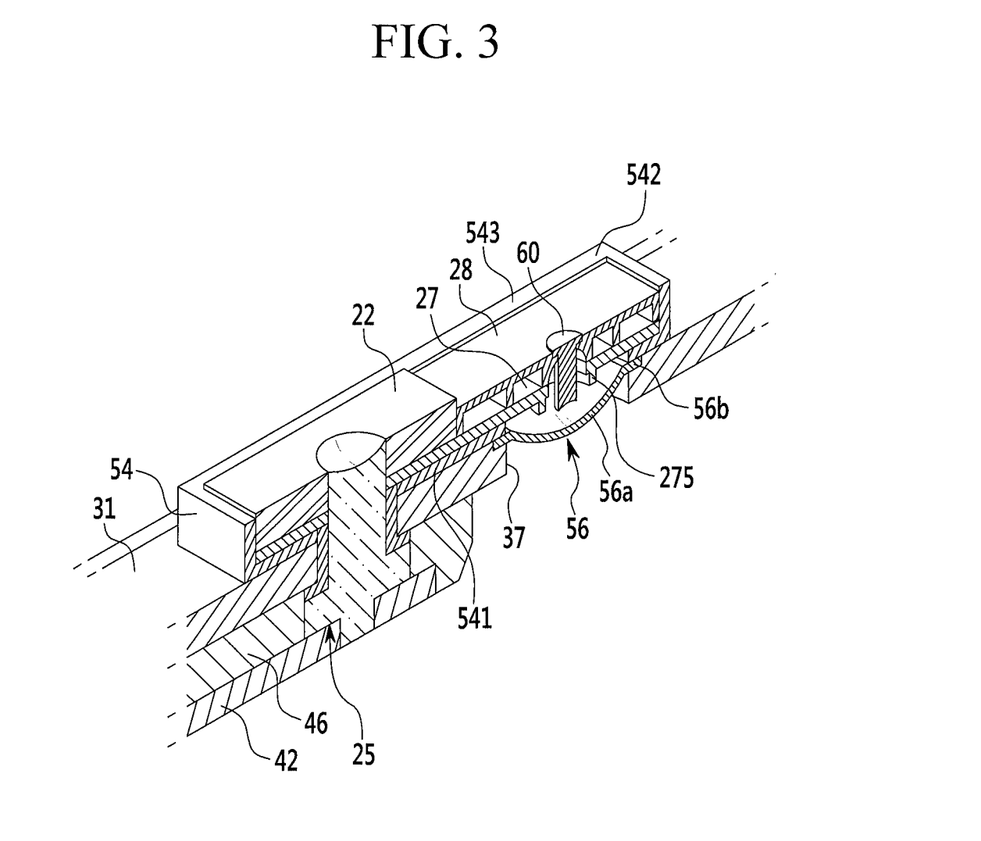
FIG. 3 is a partially cut-away perspective view illustrating the rechargeable battery according to the first exemplary embodiment of the present invention.

FIG. 3 is a partially cut-away, perspective view illustrating the rechargeable battery according to the first exemplary embodiment of the present invention.

Referring to FIG. 2 and FIG. 3, the second terminal 22 has a rectangular plate shape. The second terminal 22 is electrically connected to the negative electrode 12 through the medium of the rivet terminal 25 joined to the current collecting tab 42. A top end of the rivet terminal 25 protruding through the cap plate 31 is fixed to the second terminal 22.

A sealing gasket 55 for sealing is installed in an opening (e.g., a hole), through which the second terminal 22 is formed, between the second terminal 22 and the cap plate 31, and a lower insulation member 46 for insulating the second terminal 22 and the current collecting cap 42 from the cap plate 31 is installed under the cap plate 31.

The cap assembly 30 includes a short circuit member 56 to short-circuit the positive electrode 11 with the negative electrode 12. The short circuit member 56 is electrically connected to the cap plate 31. When internal pressure of the rechargeable battery 101 is increased, the short circuit member 56 is modified to be connected to the second terminal 22.

A short circuit opening (e.g., a short circuit hole) 37 is formed in the cap plate 31. The short circuit member 56 is disposed in the short circuit hole 37 so that the short circuit member 56 is modified when the internal pressure of the rechargeable battery 101 is increased and is connected to the second terminal 22. The short circuit 56 includes a curved part 56a which is convexly curved downward to have an arc shape, and an edge part (e.g., an edge) 56b formed along a periphery of the curved part 56a and having a plane shape.

A short circuit plate 27 is installed under the second terminal 22. The short circuit plate 27 is disposed between the second terminal 22 and the cap plate 31. An upper insulation member (e.g., an upper insulator) 54 for insulation is installed between the short circuit plate 27 and the cap plate 31. The upper insulation member 54 includes a bottom 541 having a rectangular plate shape and a side wall 542 protruding from the bottom 541.

Figure 6A:
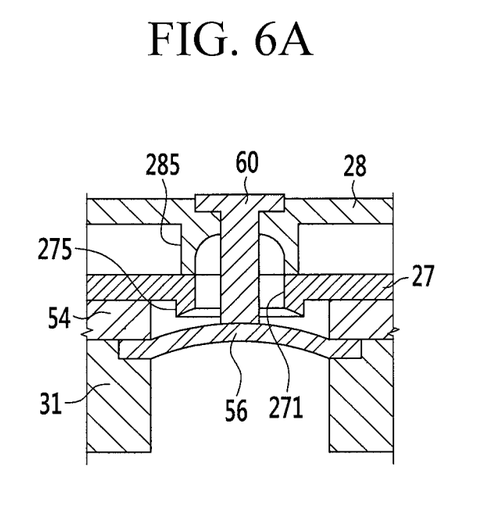
FIG. 6A is a cross-sectional view of a state of a short circuit member which is modified and makes contact with the opening/shutting member.

The short circuit plate 27 has a quadrangular plate shape extending to an upper portion of the short circuit hole 37 from a lower portion of the second terminal 22. A connection opening (e.g., a connection hole) 271, as seen in FIG. 6A, is disposed at an upper portion of the short circuit member 56 in the short circuit plate 27. Further, a short circuit protrusion 275 protruding toward the short circuit member 56 is formed in the short circuit plate 27. The short circuit protrusion 275 is continuously formed in a circumference direction of the connection hole 271 and has a ring-shaped transverse section.

When the pressure is increased, the short circuit member 56 is inversely modified. The charged current is discharged by electrically connecting the cap plate 31 charged as a positive electrode with the short circuit plate 27 charged as a negative electrode.

Figure 4:
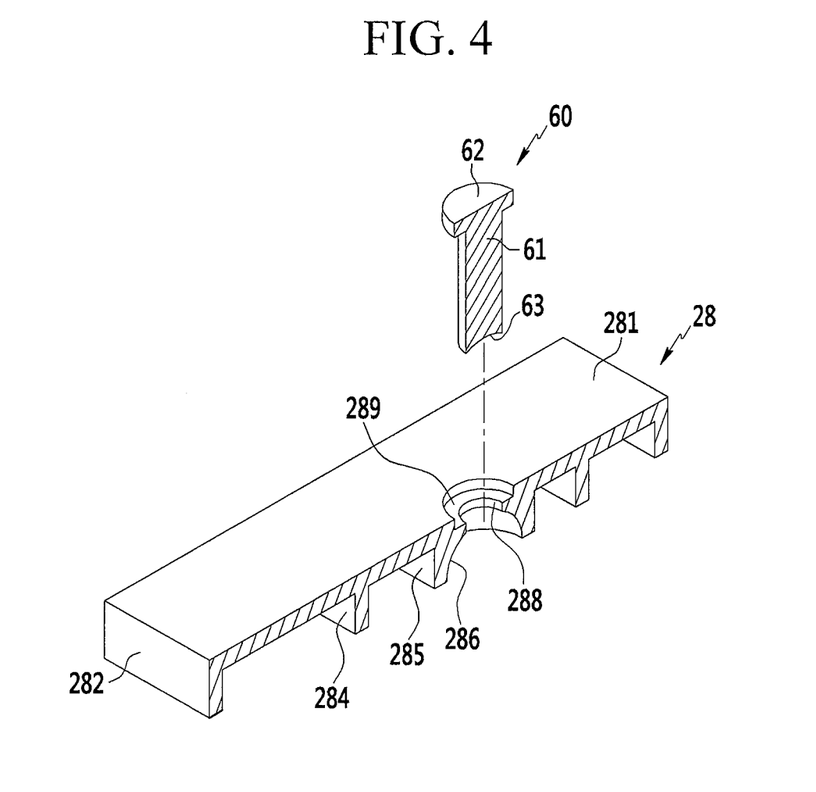
FIG. 4 is an exploded perspective view illustrating a cover and an opening/shutting member according to the first exemplary embodiment of the present invention.
Figure 5:
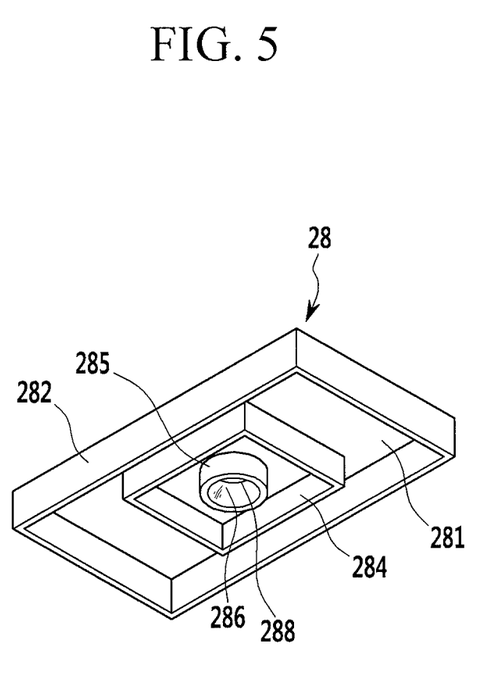
FIG. 5 is a perspective view illustrating an upper cover viewed from the top according to the first exemplary embodiment of the present invention.

FIG. 4 is an exploded perspective view illustrating a cover and an opening/shutting member according to the first exemplary embodiment of the present invention, and FIG. 5 is a perspective view illustrating an upper cover viewed from the top according to the first exemplary embodiment of the present invention.

Referring to FIG. 3, FIG. 4, and FIG. 5, an upper cover 28 covering the short circuit hole 37 is installed at an upper portion of the short circuit plate 27. The upper cover 28 is disposed close to the second terminal 22 and is made of a polymer having insulation characteristics. The upper cover 28 is press-coupled with the upper insulation member 54 and prevents or substantially prevents a foreign material from making contact with the short circuit member 56.

The upper cover 28 includes an upper plate 281 made of a rectangular plate and a lateral plate 282 protruding toward the cap plate 31 from a lateral end of the upper plate 281 and inserted into the upper insulation member 54. Further, a blocking wall 284 having a ring-shaped transverse section protrudes toward the cap plate 31 at an inner side of the lateral plate 282. The transverse section of the blocking wall 284 may have a rectangular ring shape.

An air opening (e.g., an air hole) 288 is formed at an upper portion of the connection hole 271 in the upper cover 28. A protrusion 285 defining a circumference around the air hole. 288 toward the plate 31. The protrusion 285 protrudes to surround a lower portion of the air hole 288. A curved groove 286 having an arc longitudinal section (e.g., an arc-shaped longitudinal section) is formed at a lower surface of the protrusion 285. The protrusion 285 has a ring-shaped transverse section.

A positioning groove 289 is formed at the upper cover 28. The positioning groove 289 is connected to a top end of the air hole 288. The positioning groove 289 has a structure which extends to an outer side from the top end of the air hole 288.

An opening/shutting member (e.g., a plug) 60 is inserted into the air hole 288. The opening/shutting member 60 is movably installed in upward and downward directions with respect to the air hole 288. When the short circuit member 56 is inversely modified, the opening/shutting member 60 may be pushed and moved in the upward direction by the short circuit member 56.

The opening/shutting member 60 includes a pole part (e.g., a shaft) 61 having a circular cylinder shape and a flange part (e.g., a flange) 62 protruding to a lateral direction from a length direction end portion of the pole part 61. A bottom end of the opening/shutting member 60 further protrudes in a direction toward the short circuit member 56 as compared with a bottom end of the short circuit protrusion 275. A bottom end of the opening/shutting member 60 may make contact with the short circuit member 56. If the bottom end of the opening/shutting member 60 is disposed under the bottom end of the short circuit protrusion 275, when the short circuit member 56 is modified, the opening/shutting member 60 firstly makes contact with the short circuit member 56 as compared with the short circuit protrusion 275.

The flange part 62 is inserted into the positioning groove 289, and a bottom surface 63 of the pole part 61 is curved to have an arc shape. The bottom surface 63 of the pole part 61 may be curved to have the same or substantially the same curvature as that of a top end of the inverted short circuit member 56. Accordingly, a contact area between the opening/shutting member 60 and the short circuit member 56 is increased so that the short circuit member 56 may stably press and raise the opening/shutting member 60.

Figure 6B:
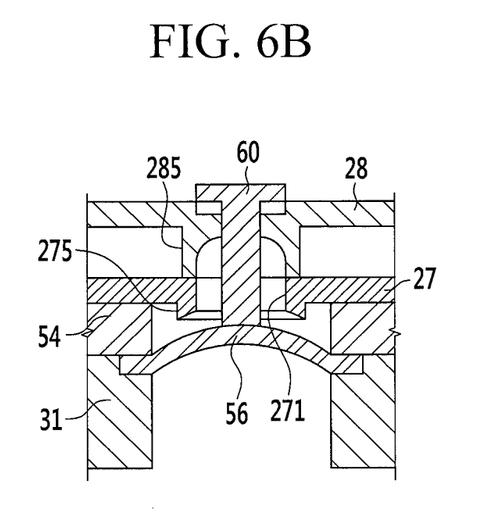
FIG. 6B is a cross-sectional view illustrating a state of the short circuit member which is modified to push and lift the opening/shutting member.
Figure 6C:
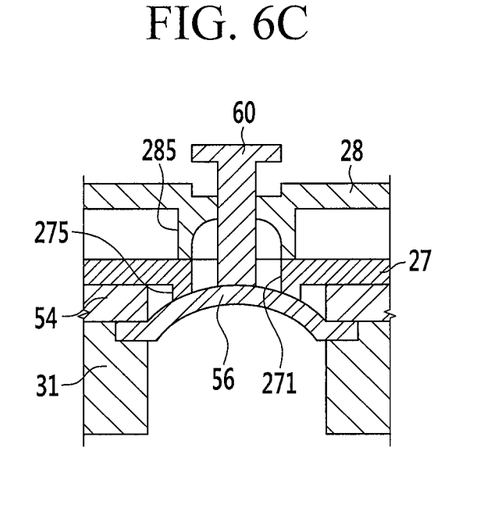
FIG. 6C is a cross-sectional view illustrating the short circuit member which is modified and makes contact with a short circuit protrusion.

FIG. 6A is a cross-sectional view of a state of the short circuit member which is modified and makes contact with the opening/shutting member, FIG. 6B is a cross-sectional view illustrating a state of the short circuit member which is modified to push and lift the opening/shutting member, and FIG. 6C is a cross-sectional view illustrating the short circuit member which is modified and makes contact with a short circuit protrusion.

As shown in FIG. 6A, if the short circuit member 56 is modified, the opening/shutting member 60 firstly makes contact with the short circuit member 56. Further, as shown in FIG. 6B, if the short circuit member 56 further ascends, the opening/shutting member 60 is moved in an upward direction so that gas is discharged to a gap between the opening/shutting member 60 and the air hole 288. As shown in FIG. 6C, if upper pressure of the short circuit member 56 is reduced, the short circuit member 56 furthers ascends to make contact with the short circuit protrusion 275 so that short-circuit is generated and the charged current is discharged.

If the internal pressure of the rechargeable battery 101 is increased, the short circuit member 56 is convexly modified upward. When the short circuit member 56 ascends, an upper space of the short circuit member 56 is reduced. Accordingly, once the upper space is completely reduced, the upper pressure of the short circuit member 56 may be increased and the short circuit member 56 will no longer ascend. However, according to the present exemplary embodiment, since the short circuit member 56 ascends to push and lift the opening/shutting member 60, the gas may be discharged to the gap between the opening/shutting member 60 and the air hole 288 to reduce the upper pressure of the short circuit member 56.

Figure 7:
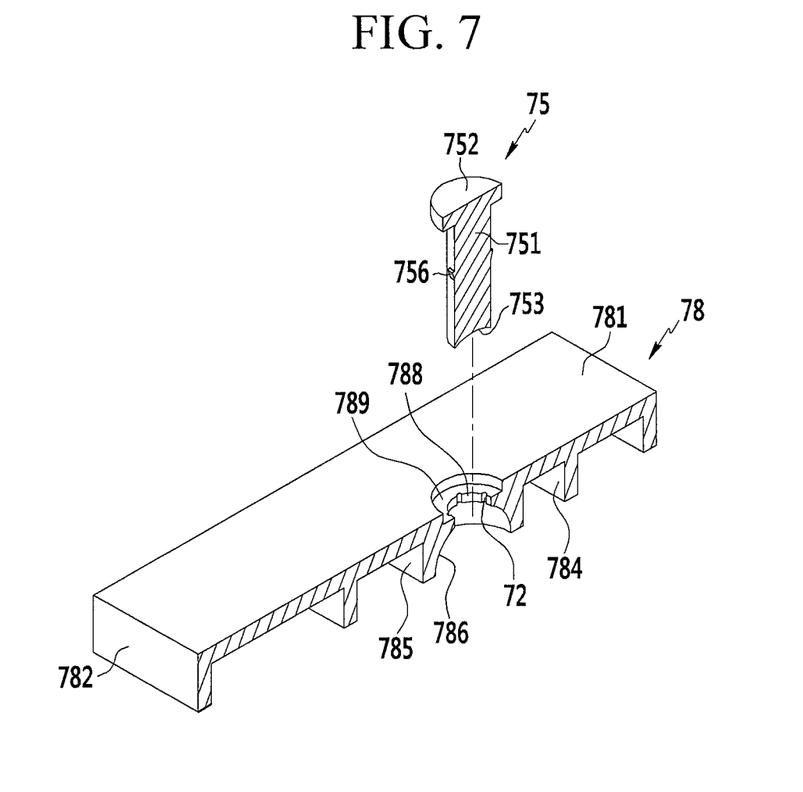
FIG. 7 is an exploded perspective view illustrating an upper cover and an opening/shutting member according to a second exemplary embodiment of the present invention.

FIG. 7 is an exploded perspective view illustrating an upper cover and an opening/shutting member according to a second exemplary embodiment of the present invention.

Since the rechargeable battery according to the second exemplary embodiment is similar to the rechargeable battery according to the first exemplary embodiment except for a configuration of the opening/shutting member and the upper cover, the same constituent elements may not be explained to avoid repetition.

Referring to FIG. 7, an upper cover 78 covering the short circuit hole 37 is installed at an upper portion of the short circuit plate 27. The upper cover 78 is disposed close to the second terminal 22 and is made of a polymer having insulation characteristics. The upper cover 78 is press-coupled to the upper insulation member 54, and prevents or substantially prevents a foreign material from contacting the short circuit member 56.

The upper cover 78 includes an upper plate 781 made of a rectangular plate, and a lateral plate 782 protruding toward the cap plate 31 from a lateral end of the upper plate 781 and inserted into the upper insulation member 54. Further, a blocking wall 784 having a ring-shaped transverse section protrudes toward the cap plate 31 at an inner side of the lateral plate 782. The blocking wall 784 may have a rectangular ring shape.

An air opening (e.g., an air hole) 788 is disposed at an upper portion of the connection hole 271 in the upper cover 78. A protrusion 785 defining a circumference around the air hole 788 toward the plate 31. The protrusion 785 protrudes to surround a lower portion of the air hole 788. A curved groove 786 having an arc longitudinal section (e.g., an arc-shaped longitudinal section) is formed at a lower surface of the protrusion 785. The protrusion 785 has a ring-shaped transverse section.

An exhaust groove 72 is formed in a height direction of the air hole 788 in the air hole 788. The exhaust groove 72 forms a path through which gas is moved between the opening/shutting member 75 and the air hole 788. According to the present exemplary embodiment, when the opening/shutting member 75 ascends, the gas may be easily exhausted through the air hole 788 via the exhaust groove 72.

A positioning groove 789 is formed in the upper cover 78. The positioning groove 789 is connected to a top end of the air hole 788. The positioning grove 789 has a structure which extends to an outer side from a top end of the air hole 788.

The opening/shutting member 75 is inserted into the air hole 788. The opening/shutting member 75 is movably installed in upward and downward directions with respect to the air hole 788. When the short circuit member 56 is inversely modified (e.g., changes shape in an inverse direction), the opening/shutting member 75 may be pushed and moved upward by the short circuit member 56.

The opening/shutting member 75 includes a pole part (e.g., a shaft) 751 having a circular cylinder shape and a flange part (e.g., a flange) 752 protruding in a lateral direction from a top end of the pole part 751. A bottom end of the opening/shutting member 75 further protrudes in a direction toward the short circuit member 56 as compared with a bottom end of the short circuit protrusion 275. A bottom end of the opening/shutting member 75 may make contact with the short circuit member 56.

The flange part 752 is inserted into the positioning groove 289, and a bottom surface 63 of the pole part 61 is curved to have an arc shape. The bottom surface 753 of the pole part 751 may be curved to have the same or substantially the same curvature as a curvature of a top end of the inverted short circuit member 56. Accordingly, a contact area between the opening/shutting member 75 and the short circuit member 56 is increased so that the short circuit member 56 may stably press and raise the opening/shutting member 75.

A support stage 756 protruding to an outer side is formed in the pole part 751 to prevent the opening/shutting member 75 from being separated from the upper cover 78. The support stage 756 protrudes in a lateral direction from an outer surface of the pole part 751, and a plurality of support stages 756 may be formed in the pole part 751. In this way, when the support stage 756 is formed, the opening/shutting member 75 may be prevented from being erroneously being separated from the upper cover 78.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their respective equivalents.

Description of Some of the Reference Symbols

| | |
|---|---|
| 101: rechargeable battery | 10: electrode assembly |
| 11: positive electrode | 11a: positive electrode uncoated region |
| 12: negative electrode | 12a: negative uncoated region |
| 13: separator | 21: first terminal |
| 22: second terminal | 25: rivet terminal |
| 26: case | 27: short circuit plate |
| 271: connection hole | 275: short circuit protrusion |
| 28, 78: upper cover | 281, 781: upper plate |
| 282, 782: lateral plate | 284, 784: blocking wall |
| 285, 785: protrusion | 286, 786: curved groove |
| 288, 788: air hole | 289, 789: positioning groove |
| 30: cap assembly | 31: cap plate |
| 41, 42: current collecting cap | 45, 46: lower insulation member |
| 54: upper insulation member | 541: bottom |
| 542: sidewall | 55: sealing gasket |
| 56: short circuit member | 56a: curved part |
| 56b: edge part | 58: connection plate |
| 59: sealing gasket | 60, 75: opening/shutting member |
| 61, 751: pole part | 62, 752: flange part |
| 63, 753: bottom surface | 72: exhaust groove |
| 756: support stage | |

What is claimed is:

1. A rechargeable battery comprising:
an electrode assembly comprising a first electrode and a second electrode;
a case having an opening and housing the electrode assembly;
a first terminal electrically connected to the first electrode;
a second terminal electrically connected to the second electrode;
a cap plate coupled to the case at the opening, the cap plate having a short circuit opening and being electrically connected to the first electrode;
a short circuit member inserted into the short circuit opening and electrically connecting the cap plate to the second terminal when the short circuit member is modified;
an upper cover covering the short circuit opening and having an air opening; and
a plug inserted into the air opening and being movable by the short circuit member.

2. The rechargeable battery of claim 1, wherein the plug comprises a shaft and a flange protruding in a lateral direction from an end of a length direction of the shaft.

3. The rechargeable battery of claim 2, wherein the plug comprises a separation prevention protrusion protruding to an outer side of the shaft.

4. The rechargeable battery of claim 2, wherein the upper cover comprises a positioning groove into which the flange is inserted, and the positioning groove is connected to a top end of the air opening.

5. The rechargeable battery of claim 2, wherein a short circuit plate is under the second terminal, and the short circuit plate comprises a connection opening above an upper portion of the short circuit member.

6. The rechargeable battery of claim 5, wherein an upper insulator is between the short circuit plate and the cap plate.

7. The rechargeable battery of claim 6, wherein the upper cover comprises an upper plate and a lateral plate protruding toward the cap plate from a lateral end of the upper plate, the lateral plate inserted into the upper insulator.

8. The rechargeable battery of claim 7, wherein the upper cover further comprises a blocking wall at an inner side of a sidewall of the upper insulator, and the blocking wall comprises a ring shaped transverse section and surrounds the protrusion.

9. The rechargeable battery of claim 5, wherein the short circuit plate comprises a short circuit protrusion, and the short circuit protrusion surrounds the connection opening.

10. The rechargeable battery of claim 5, wherein a bottom end of the plug protrudes in a direction of the short circuit member as compared with a bottom end of the short circuit protrusion, and is spaced apart from a top end of the short circuit protrusion.

11. The rechargeable battery of claim 1, wherein the upper cover comprises a protrusion defining a circumference around the air opening, and a bottom surface of the protrusion comprises a curved groove having an arc-shaped longitudinal section.

12. The rechargeable battery of claim 11, wherein, in a height direction of the air opening, an inner side of the air opening comprises an exhaust groove.

13. The rechargeable battery of claim 1, wherein a bottom surface of the plug is curved to have an arc shape.

14. The rechargeable battery of claim 1, wherein the short circuit member comprises an edge and a curved part which is convexly curved downward from the edge.

15. The rechargeable battery of claim 1, wherein the first terminal protrudes to an outer side of the cap plate and is electrically connected to the cap plate through a connection plate.

* * * * *